United States Patent [19]

Buizer

[11] Patent Number: 4,597,040
[45] Date of Patent: Jun. 24, 1986

[54] METHOD OF RETRACTING AND RETURNING A TOOL FROM AND TO A WORKPIECE DURING THE MACHINING OF THIS WORKPIECE BY A NUMERICALLY CONTROLLED MACHINING DEVICE, AND NUMERICALLY CONTROLLED MACHINING DEVICE FOR PERFORMING THE METHOD

[75] Inventor: Aart Buizer, Eindhoven, Netherlands

[73] Assignee: U.S. Philips Corporation, New York, N.Y.

[21] Appl. No.: 527,050

[22] Filed: Aug. 29, 1983

[30] Foreign Application Priority Data

Sep. 1, 1983 [NL] Netherlands .......................... 8203413

[51] Int. Cl.$^4$ ...................... G05B 13/04; G05B 19/24
[52] U.S. Cl. .................................... 364/170; 364/169; 364/474; 318/572; 408/12; 408/13; 82/2 B
[58] Field of Search ............... 364/168, 167, 170, 474, 364/475; 318/570, 571, 572; 408/10–13; 409/23, 24; 82/2 B

[56] References Cited

U.S. PATENT DOCUMENTS

| 4,017,723 | 4/1977 | Fickes | 318/570 |
| 4,271,710 | 6/1981 | Brems | 408/129 |
| 4,409,650 | 10/1983 | Noguchi | 364/169 |
| 4,503,493 | 3/1985 | Burkhardt et al. | 364/170 |

FOREIGN PATENT DOCUMENTS 0046032 2/1982 European Pat. Off. .

Primary Examiner—Michael R. Fleming
Assistant Examiner—John R. Lastova
Attorney, Agent, or Firm—Jack E. Haken; James J. Cannon, Jr.

[57] ABSTRACT

The control of a tool during a machining operation on a workpiece by means of a numerically controlled device may be interrupted for various reasons. On the occurrence of an interruption the tool is immediately retracted from the workpiece in order to be moved to a retraction position R to avoid marking the workpiece. When the tool is returned to the workpiece, the invention provides a method of moving it so that it converges tangentially towards the workpiece along a curved path, taking up the original tool machining path without marking the workpiece.

7 Claims, 8 Drawing Figures

METHOD OF RETRACTING AND RETURNING A TOOL FROM AND TO A WORKPIECE DURING THE MACHINING OF THIS WORKPIECE BY A NUMERICALLY CONTROLLED MACHINING DEVICE, AND NUMERICALLY CONTROLLED MACHINING DEVICE FOR PERFORMING THE METHOD

BACKGROUND OF THE INVENTION

The invention relates to a method of retracting a tool from a workpiece during machining of a surface of said workpiece by a numerically controlled machining device and of returning the tool to the workpiece in which the tool follows a tool machining path in which each machining position on the tool path has an associated, calculated reference position, said method comprising the steps of
(a) interrupting the machining operation;
(b) storing
   1. data which identify the progress reached in the interrupted machining program, and
   2. localization data of the reference position reached at the beginning of the interruption;
(c) determining a retraction position for the tool, said retraction position being situated remote from the workpiece;
(d) moving the tool to the retraction position;
(e) returning the tool to the workpiece along a return path.

DESCRIPTION OF THE PRIOR ART

A method of this kind is known from European Patent Application No. 0046032. The method described therein concerns the retraction and the return of a tool from and to a workpiece on a numerically controlled lathe. An interruption of a machining program in progress which moves the tool along a tool path is generated either by the control device of the lathe itself in response to the detection of an abnormality or by an operator. After generation of the interrupt signal, several data are stored in the memory of the control device of the lathe. For example, inter alia, data concerning the location (the coordinates) of a position $P_{bi}$ occupied by the tool at the instant of the interruption are stored and also previously calculated data for the control of the tool and the progress reached during the program. Subsequently, a retraction position for the tool is determined, the coordinates of a point $P_{sh}$. This determination is performed by taking into account, inter alia, a predetermined distance between the points $P_{bi}$ and $P_{sh}$ and a predetermined angle to be enclosed by the line segment $P_{bi}P_{sh}$ with respect to a tangent to the tool machining path at the position $P_{bi}$ in which the interruption took place. This angle amounts to from substantially 10° to 80°. For the calculation of the retraction position, the geometry of the tool, the position $P_{bi}$ and the machining pattern of the workpiece are taken into account in order to prevent the tool from coming into contact with the workpiece again when it is removed. After determination of the retraction position, the tool is moved to this retraction position so that the tool is removed from the workpiece. It is also possible to move the tool from this retraction position to a position which is situated even further from the workpiece, for example, in order to replace a broken tool. Afte a relevant instruction from an operator, the tool is moved to the workpiece again along a rectilinear path and the interrupted program is resumed. The position whereto the tool is returned on the surface of the workpiece to be machined can be chosen either as the position $P_{bi}$ or as an arbitrary position on the surface of the workpiece which has already been machined.

It is a drawback of such a method that the returning of the tool to the workpiece makes the tool penetrate the workpiece to some extent. This is because with each machining position of the tool path there is associated a calculated reference position which is situated inside the workpiece. The calculated reference position is situated inside the workpiece because elastic deformation of the workpiece and the tool is taken into account for the determination of the tool path. Due to this elastic deformation the tool is, inter alia, subjected to a counter-pressure from the workpiece so that the tool is pushed away from the workpiece. This must be correctd for during the determination of the tool path, so that the calculated reference positions of the tool path are actually situated inside the workpiece. Because of this the tool penetrates the workpiece to some extent when it is returned and leaves a mark on the workpiece. Such a mark, means that the machining pattern exhibits an interruption at the area of the restart machining position. A further drawback of the returning of the tool along a rectilinear path is that a directional variation of the motion of the tool occurs at the area of the restart machining position.

SUMMARY OF THE INVENTION

It is the object of the invention to provide a method in which the damaging of the workpiece by the returning of the tool to the workpiece is minimized, in which the machining pattern exhibits merely an interruption which can hardly be detected at the area of the restart position and in which, moreover, the speed of the tool exhibits hardly any directional variation at the area of the restart machining position.

The invention provides a method of retracting a tool from a workpiece during machining of a surface of said workpiece by a numerically controlled machining device and of returning the tool to the workpiece in which the tool follows a tool machining path in which each machining position on the tool path has an associated calculated reference position, said method comprising the steps of
(a) interrupting the machining operation;
(b) storing of
   1. data which identify the progress reached in the interrupted machining program;
   2. localization data of the reference position reached at the beginning of the interruption;
(c) determining a retraction position for the tool, said retraction position being situated remote from the workpiece;
(d) moving the tool to the retraction position,
(e) returning the tool to the workpiece along a return path,
characterized in that a return path, which is calculated for the return of the tool and which extends between a start position and a restart reference position which is associated with a restart machining position which coincides with a position already reached on the tool path, comprises near the restart reference position a curved position, which diverges towards the line interconnecting the successive calculated reference positions in order to extend substantially in the same direction as the tool machining path.

Because the calculated return path comprises a curved portion near the restart reference position, the tool is positioned along a curved path which is tangential to the surface of the workpiece to be machined and the tool is pushed back much more gradually by the workpiece, so that damage to and marking of the workpiece is minimized. Because, moreover, the direction of the return path at the restart reference position is substantially the same as that of the tool machining path, no directional variation of the machining motion of the tool occurs at the restart machining position.

Herein, the return of the tool to the workpiece is not only to be understood to mean the return of the same retracted tool, but also the return of a new tool. This is because, as has already been stated, after retraction of the tool from the workpiece the tool may be replaced by a new tool, for example, when the retracted tool is damaged.

A first version of a method in accordance with the invention is characterized in that the return path and the tool machining path are situated in the same plane. The return path can thus be simply defined in a flat plane.

A second version of a method in accordance with the invention is characterized in that the retraction position and the start position coincide. Because the retraction position is a known position determined upon retraction of the tool, the return path preferably starts from this retraction position in order to save calculation time.

A further version of a method in accordance with the invention is characterized in that the return path is shaped as a segment of circle. Such a return path can be simply defined.

Another version of a method in accordance with the invention is characterized in that the segment of circle path amounts to substantially one quarter of a circle. When the angle between the line segment which connects the reference position of the tool upon occurrence of an interruption to a retraction position and a tangent line of contact to the calculated tool path in said reference position of the tool amounts to substantially 45°, the radius of the circle can be very simply determined and the segment of circle path amounts to substantially one quarter of the circle.

Yet another version of a method in accordance with the invention is characterized in that the tool is brought into contact with the workpiece near the restart machining position, so that elastic deformation of the tool and/or the workpiece occurs near the restart machining position. This elastic deformation is taken into account for the determination of the reference positions of the tool path.

The invention also relates to a numerically controlled machining device for performing the method in accordance with the invention.

An embodiment of the invention will be described in which the tool is a cutting tool and the numerically controlled machining device is a numerically controlled lathe. Evidently, the method in accordance with the invention can also be used for any other numerically controlled machining device, for example, a milling machine or a grinding machine.

BRIEF DESCRIPTION OF THE DRAWINGS

The embodiment will be described in detail hereinafter with reference to the accompanying drawings, in which.

DESCRIPTION OF THE PREFERRED EMBODIMENTS

Figure 1:
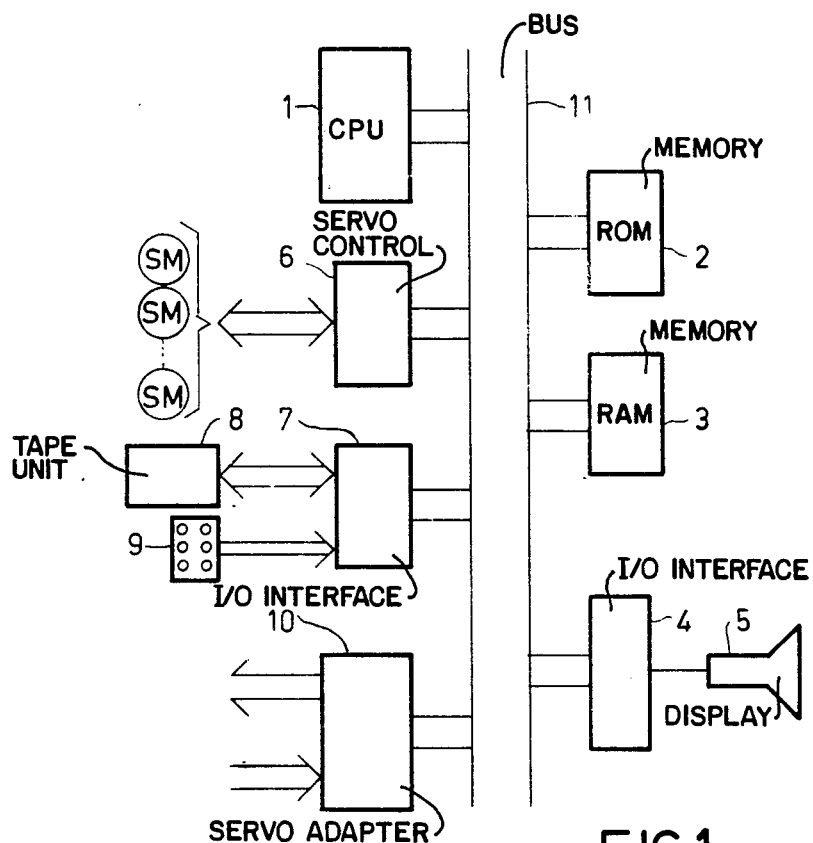
FIG. 1 shows the principal components of a control device for controlling a numerically controlled lathe.

FIG. 1 shows an embodiment of the principal components of a control device for controlling a numerically controlled lathe. A central processor unit 1 (CPU) is connected to a bus 11 on which the control data is transported. This central processor unit controls and processes the control data and utilizes a first memory 2 and a second memory 3 which are connected to the bus. The first memory is, for example, a ROM or an EPROM (Intel 2716) and is used for the storage of machine programs required for the control of the lathe. The second memory is, for example a RAM and is inter alia used for the temporary storage of data during the execution of user programs by the central processor unit. Also connected to the bus is a first input/output interface 4, an output of which is connected to a display apparatus 5, for example, a television monitor for the display of data for the operator of the lathe. Also connected to the bus is a servo-control unit 6 for the control of servo motors SM. These servomotors provide, for example, the displacement of a slide on which a tool is secured to a position indicated by the central processor unit. Another function of a servomotor is to rotate a main spindle on which a workpiece is mounted by way of a chuck or clamping device at the desired speed. Also connected to the bus is a second interface 7. Data input/output equipment is connected to this second interface, for example, a recording tape unit 8 for reading (and eventually also writing) machining programs on a tape, and a control panel 9 for the input of control data by the operator. The element 10 is a servo adapter for one or more coordinate axes (x, y, z) of the reference system of the lathe. Positioning coordinates are provided on the output of this servo adapter. The servo adapter also comprises an input for receiving positioning coordinates.

A workpiece is machined by means of a lathe comprising a numerical control system as follows. In order to obtain an object of the desired shape the machining pattern for the workpiece is presented to the control device either via the recording tape unit 8 (for example, a punched tape reader or a cassette recorder) or is fetched from the first memory 2. Using the control panel 9, the operator inputs specific data such as, for example, the location of the workpiece, the nature of the workpiece and the tools, the dimensions of the tools etc. The operator does so after, for example, receiving a relevant request from the machining program which is displayed on the screen of the display apparatus 5 on which the data input by the operator is also displayed, so that the operator can check whether the inserted data have been correctly received.

Under the control of the central processor unit 1, a machine program is executed for cutting a workpiece to a given pattern for which, inter alia, control signals are generated for the servomotors. These servomotors drive the slide on which one or more tools are accommodated and also drive the workpiece in rotation at the desired speed. The slide can be displaced with a high accuracy in the order from 1 to 20 μm in a two-dimensional (x, z) plane or a three-dimensional (x, y, z) space over a given distance by means of the servomotors. When the slide accommodates several tools, the selection of the tool from the various tools present on the slide by the machining program can take place in accordance with the nature of the operation to be executed and with the type of lathe.

During the machining of the workpiece, an interruption of the machining program may be desirable or necessary for various reasons. The reasons for interruption will be discussed hereinafter with reference to FIG. 4. In the case of such an interruption the tool is retracted from the workpiece in order to be moved to a retraction position.

Figure 2A:
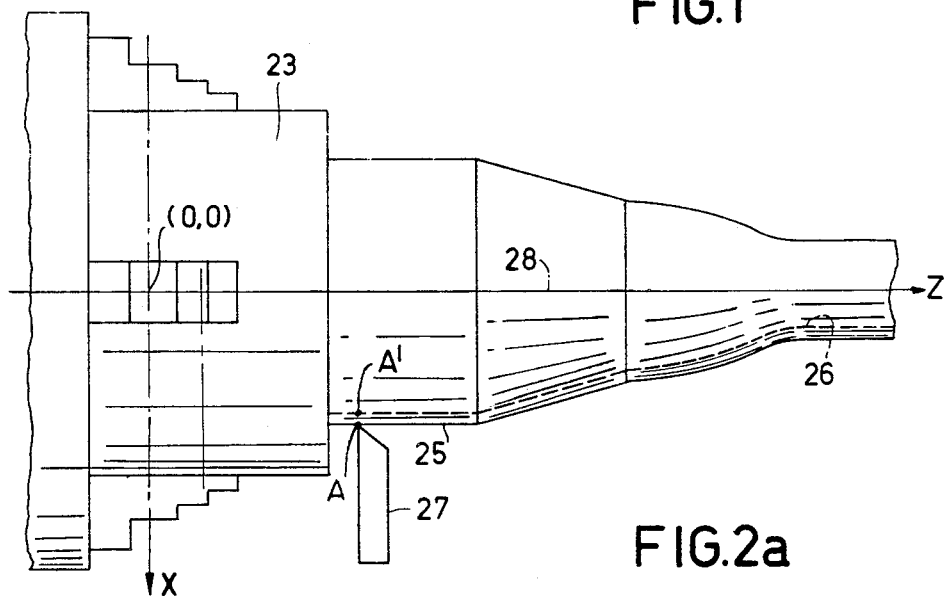
FIG. 2a is a cross-sectional view of the workpiece.

FIG. 2a is a cross-sectional view of a workpiece 23. The (x, z) reference system is a reference system associated with the lathe, the positive direction of the axes thereof being denoted by arrows in the FIGURE. The center line (28) of the workpiece coincides with the z-axis of the reference system and the x-axis is situated in a boundary plane of the workpiece accommodated in the chuck of the main spindle. During a machining operation the workpiece rotates around the z-axis and a tool 27 moves within the (x, z) reference system. Evidently, the tool can also move in a direction perpendicular to the plane determined by the x-axis and the z-axis of the reference system, but this will not be elaborated herein. All coordinates mentioned in the following description will be given in this (x, z) reference system. The tool 27 moves along a tool path 25. This tool path is the path actually followed by the tool and deviates from the calculated tool path 26. This deviation is caused by the fact that the tool is pushed back by the workpiece due to elastic deformation of tool and workpiece when these elements contact one another. Such pushing back is taken into account for the determination of the tool path, so that the calculated tool path is situated within the workpiece. Consequently, with each machining position A on the tool path 25 there is associated a reference position A' on the calculated tool path 26.

Figure 2B:
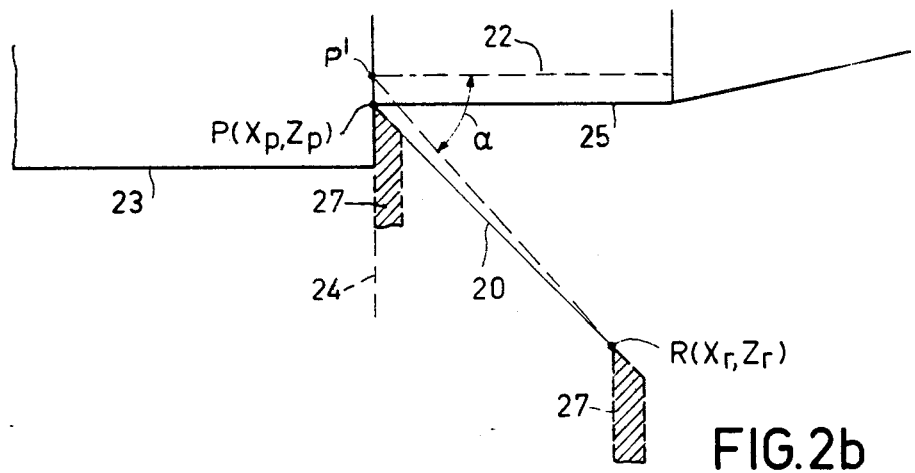
FIG. 2b illustrates the retraction of the tool.

FIG. 2b illustrates the retraction of the tool from the workpiece. It is assumed that the tool is situated at a point P (the interruption point) having the coordinates $(x_p, z_p)$ on the tool path 25 at the instant of interruption. P' is the corresponding calculated tool position or interrupted reference point. The reference numerals of FIG. 2b and FIGS. 3a and 3b correspond to the reference numerals of FIG. 2a. The tool is retracted from the workpiece because the workpiece usually continues to rotate during an interruption. Should the tool not be retracted from the workpiece, it would continue to rub against the workpiece so that a groove would be cut therein at the point of interruption and additional wear of the tool would occur. Therefore, it is retracted to a posistion R, having the coordinates $(z_r, z_r)$, said position being referred to as the retraction position.

The line segment 20' which interconnects the points P' and R encloses an angle α with respect to the vector 22 in the point P' on the calculated tool path. A vector at a point situated on the calculated tool path is to be understood to mean the line tangent to the calculated tool path at that point situated in the (x, z) reference system. The direction of the vector coincides with the feed direction. The angle α is determined counterclockwise from the vector 22 to the line segment P'R. This angle α varies between approximately 10° and 80°. The angle α is preferably from 44° to 46° and the reason for this will be explained hereinafter.

As is known, it is also possible to displace the tool from its retraction position to a position which is situated further from the workpiece under numerical control. This is done, for example, to replace a broken tool. For the displacement of the tool from the point of interruption to the retraction point R the geometry of the workpiece and the instantaneous position of the tool are taken into account as is known from European Patent Application No. 0046032.

Figure 3A:
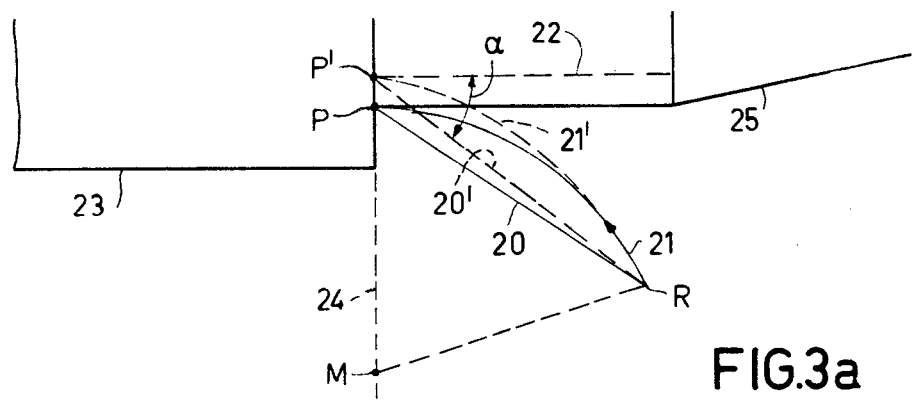
FIGS. 3a, b and c illustrate the return of the tool to the workpiece.

After an interruption the tool or a new tool is returned to the workpiece after a relevant instruction from the operator of the lathe. FIG. 3a shows a first method of returning the tool to the workpiece in accordance with the invention. The tool is moved to the workpiece along a return path 21 so that an uninterrupted tangential infeed of the tool along the workpiece is obtained. The speed of the tool during the infeed equals the feed rate. There are various possibilities for realizing the calculated return path 21'. In the first embodiment as shown in FIG. 3a the path 21' is formed by a segment of a circle between the retraction point R and the interruption reference point P'. The segment of circle starts from the retraction point R for practical reasons, because the tool will usually be at this point after an interruption and because, moreover, the coordinates $(x_r, z_r)$ of this point have already been determined upon retraction of the tool so that they are known. Evidently, the return path 21' may also start from a point other than the point R, but more calculation time will then be required. Instead of a segment of circle it is also possible to choose another shape of curved path for the path 21', for example an elliptical or sinusoidal path. It is important, however, that the infeed of the tool along the workpiece is tangential, so that the tool is returned tangentially to the workpiece near the restart machining position, in this case P. As has already been mentioned, a calculated reference position is associated with each machining position on the tool path. The segment of circle for the return path 21' is determined between the points R and P'. Actually, the tool follows the path 21 between the points R and P. Because the shape of this path 21 is very close to that of the calculated path 21', no further distinction will be made hereinafter between the actual return path and the calculated return path. The further description will be given with reference to the return path actually followed by the tool. The direction of the return path 21 at the point P now corresponds substantially to the direction of the tool machining path at the point P, so that at P the direction of the speed of the tool corresponds substantially to the feed direction.

Figure 3B:
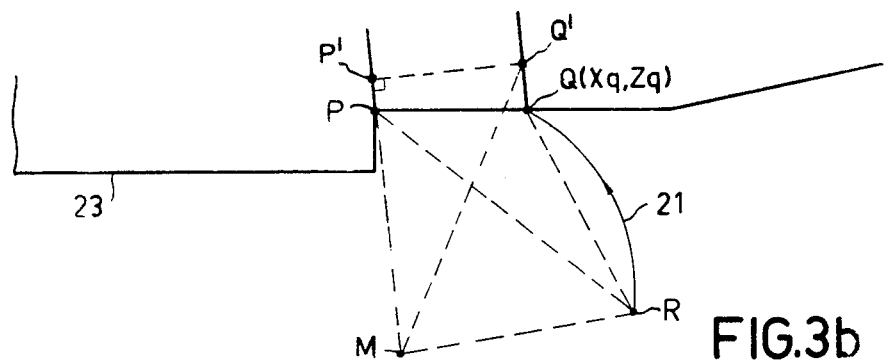

It is alternatively possible to return the tool to the workpiece at a point other than the interruption point P. This is necessary, for example, should the workpiece be damaged or inaccurately machined due to a broken tool. FIG. 3b shows an embodiment in which the tool is returned to a point Q having the coordinates $(x_q, z_q)$ on the tool path. The path between P and Q on the tool path is then machined again. During the movement from R to Q, the tool again follows the segment of circle 21.

Figure 3C:
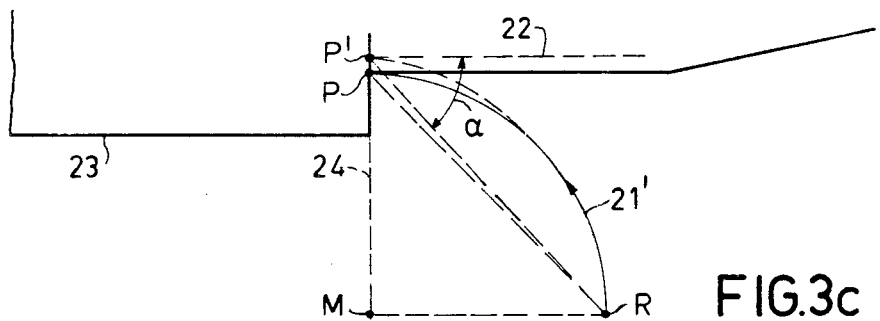

When the angle α between the vector 22 at the point P' and the line segment P'R amounts to substantially 45° as indicated in FIG. 3c, the segment of circle 21' is exactly one quarter of a circle having a center M. This center M is determined by the perpendicular projection of R onto the line 24 which extends perpendicularly to the vector 22 at the point P'. The radius (r=PM=MR) is simply determined by:

$$r = \frac{\sqrt{2}}{2}[P'R]$$

in which [P'R] represents the length of the line segment P'R. It will now be clear why the angle α is preferably chosen so as to be substantially equal to 45°. The determination of the center M and the radius r is particularly simple when such an angle α is chosen.

When the angle α is not equal to 45° but has some other value between approximately 10° and 80°, a center M is determined, for example, subject to the following conditions.

1. M is a point on the perpendicular 24 at P to the vector 22.
2. The distance d (P', M)=d(M, R)=r in which r is the radius of the circular segment 21.

Using the cosine rule it can be determined that $$r = \left|\frac{[P'R]}{2\sin\alpha}\right|$$

This is illustrated in FIG. 3a. The choice of the center M on the perpendicular (24) is not the only feasible choice for a segment of circle path 21 between the points P and R.

When instead of the point P a point Q is used as shown in FIG. 3b, the second requirement becomes:

$$d(Q', M)=d(M, R)=r.$$

The center M is chosen, for example, again on the perpendicular 24. This radius r is then determined as follows. In the triangle PRM using the cosine rule, $$[MR]^2=[P'M]^2+[P'R]^2-2[P'R]\cdot[P'M]\cdot\cos(90°-\alpha)$$

which can be written as $$r^2=[P'M]^2+[P'R]^2-2[P'R]\cdot[P'M]\cdot\sin\alpha. \quad (1)$$

Furthermore, P'Q' is a known length and the triangle Q'P'M is a right-angled triangle. Consequently, $$[Q'M]^2=[P'M]^2+[P'Q']^2$$

which can be written as $$[P'M]^2=r^2-[P'Q']^2 \quad (2)$$

substitution of (2) and (1) produces $$r^2 = r^2 - [P'Q']^2 + [P'R]^2 - 2[P'R]\sqrt{r^2-[P'Q']^2}\sin\alpha \quad (3)$$

$$r = \sqrt{\left(\frac{[P'Q']^2-[P'R]^2}{2\sin}\right)^2 + [P'Q']^2}$$

When the center M is not situated on the perpendicular 24, r can be determined analogously.

Figures 4, 5:
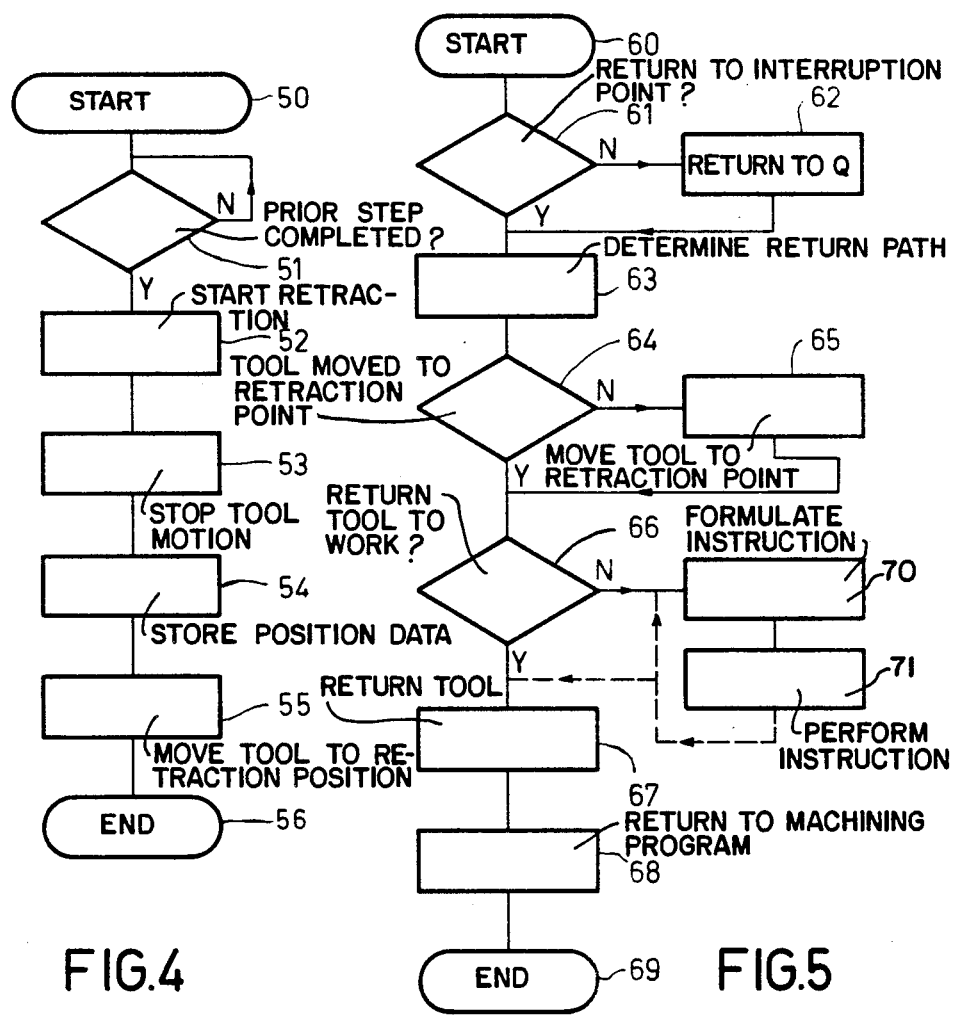
FIG. 4 shows an example of a subroutine in the form of a flowchart for the retraction of a tool from a workpiece.
FIG. 5 shows an example of a subroutine in the form of a flowchart for returning a tool to a workpiece.

The retraction of the tool from the workpiece in the case of an interruption is performed under the control of the control device of the lathe. FIG. 4 shows an example of a subroutine in the form of a flowchart for the retraction of the tool from a workpiece. Hereinafter, such subroutine will be referred to as "retraction subroutine". This subroutine is stored, for example, in the first memory (2 in FIG. 1) of the control device of the lathe. The retraction subroutine can be initiated by the lathe itself as well as by the operator. Initiation by the operator takes place for example, by means of a switch on the control panel (9 in FIG. 1) of the control device. As has already been stated, the retraction subroutine can be initiated for various reasons. For the purpose of illustration some possible reasons for the initiation of the retraction subroutine will be given hereinafter.

(a) The operator of the lathe detects an abnormality, for example workpiece damage and wishes to perform a check.

(b) The operator wishes an interruption, for example, for a break.

(c) The control device detects an abnormality necessitating an interruption, for example, that the temperature of the workpiece or the tool has become too high.

(d) The program executed by the central control unit necessitates an interruption, for example for changing to another type of tool.

A diamond in the FIGS. 4 and 5 represent an interrogation step and a rectangle represents an execution step. After initiation (50) of the subroutine, a check (51) is made whether the step of the program in progress has been completed. When this step has been completed, the program in progress is interrupted and the retraction subroutine is started (52). If not, the completion of said step is awaited. The retraction subroutine starts with the stopping of the tool motion (53). Subsequently (54), all data required on the one hand for the subroutine itself, and on the other hand for returning the tool to the workpiece and for resuming the program in progress are stored in the memory. For example, the following data are, inter alia, stored in the memory which may for example be the second memory 3 in FIG. 1, (a) the coordinates ($x_p$, $z_p$) of the interruption point P,
(b) the instantaneous position of the tool in the tool path,
(c) the geometry of the tool which is a code which is associated with each tool and which contains information such as for example the length of the tool, the nose radius and the type of tool,
(d) the address of the last program step executed, which can also be achieved, for example, by memorizing the position of the program pointer in the central control unit which indicates the various steps of the program, and
(e) the data of the tool position which follows the interruption point. This is necessary because these positions are customarily determined in advance in numerically controlled lathes. Actually this means memorizing the content of the buffer of the servo adapter 10 and the servo control unit 6, because said data are available therein.

Subsequently (55), the coordinates of the retraction position R are determined and the tool is moved to this retraction position R. The length of the line segment P'R is a parameter which is stored in the memory of the control device. This parameter can be varied by storing a different value of this parameter in the relevant memory location. However, any variation of this parameter should be performed before the interrupt subroutine is started, because no time is available for this purpose during the execution of the subroutine. The same is applicable to the value of the angle $\alpha$ between the vector and the line segment P'R. This value is also preferably stored in the memory before the interrupt subroutine is initiated. The calculated coordinates $(x_r, z_r)$ of the retraction position R are stored in the memory. The coordinates $(x_r, z_r)$ of the point R are calculated by using the vector at the position P', the distance P'R, the angle $\alpha$ and the tool geometry of the tool. The tool is retracted from the cutting plane and the workpiece surface at an angle of preferably 45° in the described manner. The retraction of the tool is performed at an increased speed, which means that the retraction movement is performed at the positioning speed of the relevant machine part. When the tool has been moved to the retraction point R, the retraction subroutine has been completed (56). The data stored during the step 54 of the retraction subroutine are retained in the memory because they are necessary for returning the tool to the workpiece. After completion of the retraction subroutine, the operator can select any one of various possibilities. For example, he could switch over to manual control.

The tool is returned to the workpiece after a relevant instruction from the operator, for example, by depression of an appropriate button on the control panel and, of course, after completion of the retraction subroutine. The tool is returned to the workpiece under the control of a control device of the lathe. FIG. 5 shows an example in the form of a flowchart of a subroutine for returning a tool to the workpiece in accordance with the invention. This subroutine will be referred to hereinafter as the "return subroutine". This subroutine is also stored, for example, in the first memory of the control device of the lathe. After initiating (60) the return subroutine the operator is requested to state (61) whether a return to the interruption point P is desired. If the operator's reply is negative, he will be requested to state (62) the point Q whereto the tool is to be returned. The operator then inputs to the control device, for example a distance determined with respect to the point P and along the tool path. The central control unit then determines the coordinates $(x_q, z_q)$ of Q.

After input of Q or after a positive reply to the question in step 61, the coordinates of the return path between the points R and P' (or Q') are determined (63). This determination of the return path, for example, a segment of circle path, is performed as described with reference to the FIGS. 3a, b and c by utilizing, inter alia, the coordinates of R, P' or Q' and also the angle $\alpha$ and the vector 22. This calculation is performed by the arithmetic unit of the central processor unit.

During the next step (64) the control device checks whether the tool has indeed been moved to the retraction point R (65). When the control device has established that the tool is indeed present at the position R, the operator is asked (66) whether the return of the tool to the workpiece is permissible. If the operator agrees (67), the tool is moved tangentially to the surface of the workpiece to be machined under the control of the central processor unit and via the calculated return path. This movement is performed at the machining speed (referred to as "feed") of the tool prior to the interruption. After completion of this operation a jump is made (68) to the interrupted machining program in progress in order to complete this program, thus terminating the interruption subroutine (69).

Should the operator not agree to the return of the workpiece (step 66), the operator will be requested to formulate his instructions (70). The operator utilizes this possibility, for example, should he detect an error after all. The central processor unit subsequently performs the operator's instruction (71) and, depending on the formulated instruction, subsequently returns to the interrupt subroutine (step 67) or executes a further operation.

What is claimed is:

1. In a numerically controlled machining device a method of retracting from and returning a tool respectively to a workpiece during the execution of a program for machining a surface of said workpiece, wherein during said machining the tool being controlled is to follow a tool machining path determined from a calculated tool path and wherein for each reference position on the calculated tool path there is an associated machining position on the tool machining path, said method comprising the steps of:

(a) interrupting the tool progression on the tool machining path along the workpiece during said machining;

(b) storing a first set of data which identify the progress reached in the interrupted machining program and a second set of data which identify the reference position reached at the beginning of the interruption;

(c) determining a tool retraction position which is situated remote from the workpiece;

(d) moving the tool to said tool retraction position;

(e) fetching said second set of data, and determining, on the basis of said reference position reached at the beginning of the interruption, a restart reference position which has its associated restart machining position situated on the tool machining path on a location already reached by the tool before said interruption occurred;

(f) determining a calculated return path which extends between the retraction position and a restart reference position, and wherein at least a part of said calculated return path describes a curved portion which, near the restart reference position, diverges towards a line interconnecting successive reference positions of the calculated tool path, and wherein said calculated return path extends substantially in the same direction as the calculated tool path near the restart reference position;

(g) determining a tool return path on the basis of said calculated return path;

(h) under control of a generated restart command;
(h1) fetching said first set of data;
(h2) returning the tool to the workpiece along said tool return path;
(h3) restarting the interrupted machining program by using the first set of data when said tool has reached the restart machining position.

2. A method as claimed in claim 1, wherein the curved portion of the calculated return path is shaped as a segment of circle.

3. A method as claimed in claim 2, wherein the segment of circle path amounts to substantially one quarter of a circle.

4. A method as claimed in claim 1, 2 or 3, wherein the tool return path and the tool machining path are situated in the same plane.

5. A method as claimed in claim 1, 2 or 3, wherein the tool is brought into contact with the workpiece near the restart machining position, so that elastic deformation of the tool and/or workpiece occurs near the restart machining position.

6. A numerically controlled machining device comprising:
   (a) drive means for driving a tool along a tool machining path during the execution of a program for machining a surface of a workpiece, said tool machining path being determined from a calculated tool path wherein for each reference position on the calculated tool path there is an associated machining position of the tool machining path;
   (b) interrupting means for interrupting the tool progression on the tool machining path along the workpiece during said machining;
   (c) storage means connected to said interrupting means for storing a first set of data which identify the progress reached in the interrupted machining program and for storing a second set of data which identify the reference position reached at the beginning of the interruption;
   (d) first means connected to said drive means and being provided for determining a tool retraction position which is situated remote from the workpiece;
   (e) second means connected to said storage means and being provided for determining on the basis of said reference position reached at the beginning of the interruption, a restart reference position which has its associated restart machining position situated on the tool machining path on a location already reached by the tool before said interruption occurred;
   (f) path determining means connected to said first and said second means being provided for determining a calculated return path which extends between the retraction position and the restart reference position, and wherein at least part of said calculated return path describes a curved portion which, near the restart reference position, diverges towards a line interconnecting successive reference positions of the calculated tool path, and wherein said calculated return path extends substantially in the same direction as the calculated tool path near the restart reference position, said path determining means being further provided for determining a tool return path on the basis of said calculated return path;
   (g) control means connected to said drive means, said first and second means and to said path determining means and being provided for controlling the retraction of the tool from the workpiece to the retraction position and for controlling the return of the tool to the workpiece along the tool return path.

7. A numerically controlled machining device as claimed in claim 6, wherein said numerically controlled machining device being a lathe.

* * * * *